United States Patent [19]

Robles et al.

[11] Patent Number: 5,379,167
[45] Date of Patent: Jan. 3, 1995

[54] MAGNETIC TAPE CARTRIDGE WITH SECOND GENERATION LEADER BLOCK AND LEADER BLOCK PIN

[75] Inventors: Guillermo S. M. Robles, Tucson, Ariz.; Michael L. Sendelweck, Lafayette, Colo.

[73] Assignee: International Business Machines Corporation, Armonk, N.Y.

[21] Appl. No.: 76,321

[22] Filed: Jun. 14, 1993

[51] Int. Cl.⁵ .................... G11B 15/67; G11B 23/107
[52] U.S. Cl. ........................................ 360/95; 360/132
[58] Field of Search .................... 360/95, 85, 132; 242/195, 197, 199

[56]     References Cited

U.S. PATENT DOCUMENTS

| | | | |
|---|---|---|---|
| 4,383,660 | 5/1983 | Richard et al. | 242/197 |
| 4,426,047 | 1/1984 | Richard et al. | 242/197 |
| 4,452,406 | 6/1984 | Richard | 242/195 |
| 4,832,284 | 5/1989 | Inoue | 360/95 |

FOREIGN PATENT DOCUMENTS

0368667A2  9/1989  Japan .......................... G11B 15/67

*Primary Examiner*—Robert S. Tupper
*Attorney, Agent, or Firm*—Baker, Maxham, Jester & Meador

[57]     ABSTRACT

A new generation magnetic tape cartridge of the type having a leader block is provided along with a new generation leader block pin so as to prevent interlocking with respect to prior art leader blocks and leader block pins. The magnetic tape cartridge is a generally rectangular container which has four corners. One of the corners of the container is beveled and is provided with a well to receive the new generation leader block in a nested position. The new generation leader block has a notch which has top, bottom and middle portions. A cross section of the middle portion of the notch is smaller than the cross section of the bottom portion of the notch, and the cross section of the top portion of the notch is smaller than the cross section of the middle portion of the notch. The cross section of the bottom portion of the notch is defined by a circular arc of more than 180° for receiving and capturing a new generation leader block pin. The top portion of the notch in the block is fashioned to confine the new generation leader block pin to a predetermined amount of lateral movement. The configurations of the notch of the new generation leader block and the new generation leader block pin are fashioned to prevent interlock with prior art reader blocks and leader block pins.

32 Claims, 8 Drawing Sheets

MAGNETIC TAPE CARTRIDGE WITH SECOND GENERATION LEADER BLOCK AND LEADER BLOCK PIN

BACKGROUND OF THE INVENTION

1. Field of the Invention

The present invention relates to a magnetic tape cartridge which is operable with a Leader block and leader block pin, the leader block and leader block pin being uniquely configured so as to be inoperable with a prior art leader block and leader block pin.

2. Discussion of the Related Art

IBM developed the 3480/3490 type magnetic tape cartridge which is processed by the 3480 or 3490 type cartridge drive. This type of magnetic tape cartridge has a leader block which recesses and nests in one of the corners of the cartridge. The leader block is connected to a leader of the magnetic tape which is stored on a reel within the cartridge. The leader block is notched to provide a cavity for receiving and interlocking with an enlarged portion of a pin associated with the cartridge drive. The pin is connected to an arm which is operated by the cartridge drive for pulling the leader block out of the cartridge and threading the magnetic tape onto a reel for processing purposes, such as read/write functions. The 3480/3490 magnetic tape cartridge and cartridge drive are commercial items in the industry. The magnetic tape is formulated with chromium dioxide and has a thickness of about 72 gauge. The 3480/3490 cartridge drive is designed to process tapes with these characteristics.

The industry has seen the emergence of a new magnetic tape which is significantly different from the former magnetic tape. The new magnetic tape has a formulation of metal particles and has a reduced thickness, namely about 57 gauge. It is necessary that a new tape drive be provided which can process the new tape with less tension than that applied to the existing tape. Further, the new drive must be able to process the new formulation of the tape. Except for these modifications, it is desired that the new tape drive be substantially the same as the existing tape drive. With this arrangement the existing tape drives can be converted to new tape drives with minor modifications. This protects the significant investment that has been made in the existing tape drives. It is important that the new magnetic tape cartridge not be inserted into the existing tape drives or that the existing magnetic tape cartridge not be inserted into the new tape drive. If either one of these occurrences took place, it would most likely result in destruction of the tape and loss of important data. In order to solve this problem, efforts have been undertaken to electronically detect insertion of an improper cartridge. This approach, however, required the tape to be threaded into the drive before preventative measures were undertaken. It is desirable that this problem be solved before the magnetic tape is moved into the cartridge drive by an arrangement which does not require electronic sensing devices.

SUMMARY OF THE INVENTION

The present invention provides an arrangement for preventing the threading of a new generation magnetic tape within a present generation ("prior art") cartridge drive and preventing the threading of a present generation ("prior art") magnetic tape within a new generation cartridge drive. All of the existing components of the prior art magnetic tape cartridge have been preserved except for a leader block. Further, all of the existing components of the prior art cartridge drive have been preserved except for a leader block pin and drive components involving formulation of the tape and tape tension. This has been accomplished by providing a magnetic tape cartridge which has a uniquely configured leader block. The invention further includes a leader block pin which is uniquely configured to be received and captured by the new leader block. The prior art magnetic tape cartridge includes a generally rectangular container which has top and bottom plates, front and rear plates, and a pair of side plates. The plates provide the container with a pair of front corners and a pair of rear corners. A generally rectangular leader block is adapted to be connected to a leader end of a magnetic tape within the container. One of the front corners of the container is beveled and is provided with a well to receive the leader block in a nested position. The top and bottom plates and the leader block each have a notch, the notches of these elements being substantially axially aligned with respect to one another when the block is nested in the container well.

The prior art magnetic tape cartridge is converted into a new generation magnetic tape cartridge by modifying it with a unique leader block. The notch in the new leader block has top, bottom and middle portions. The cross section of the middle portion of the notch is smaller than the cross section of the bottom portion of the notch, and the cross section of the top portion of the notch is smaller than the cross section of the middle portion of the notch. The cross section of the bottom portion of the notch is defined generally by a circular arc of more than 180° for receiving and capturing an enlarged cylindrical portion of the leader pin. The top portion of the notch in the block is fashioned to confine the stem of the leader pin to a predetermined amount of lateral movement. Because of inherent erratic movements of the arm of the cartridge drive, the top portion of the notch provides stability when the new generation leader pin interlocks with the new generation leader block. The new generation leader block and leader block pin are uniquely configured and dimensioned to prevent an interlock between the new generation leader block and prior art leader block pin or between the prior art leader block and the new generation leader block pin. These particular configurations and dimensions will be described in the description of the invention hereinbelow.

An object of the present invention is to provide a mechanical arrangement for preventing a new generation leader block from interlocking with a prior art leader block pin and for preventing a prior art leader block from interlocking with a new generation leader block pin.

Another object is to provide a uniquely configured new generation leader block and/or leader block pin which will not interlock with a prior art leader block pin and/or leader block.

A further object is to provide a new generation leader block and leader block Din which will not interlock with the prior art leader block pin and leader block, and yet will allow the corresponding magnetic tape cartridge to be fully registered in the corresponding magnetic tape drive.

Still another object is to prevent an interlock between new generation leader block and leader block pin components with prior art leader block pin and leader block components with a minimum of design impact on prior art leader block type of magnetic tape cartridges and corresponding cartridge drives.

Still a further object is to provide a prior art cartridge with new a generation magnetic tape and new generation leader block which cannot be operated in a prior art leader block type of cartridge drive.

These and other objects will be better understood from the following detailed description, taken together with the below described drawings.

DETAILED DESCRIPTION OF THE PREFERRED EMBODIMENTS

Figure 1:
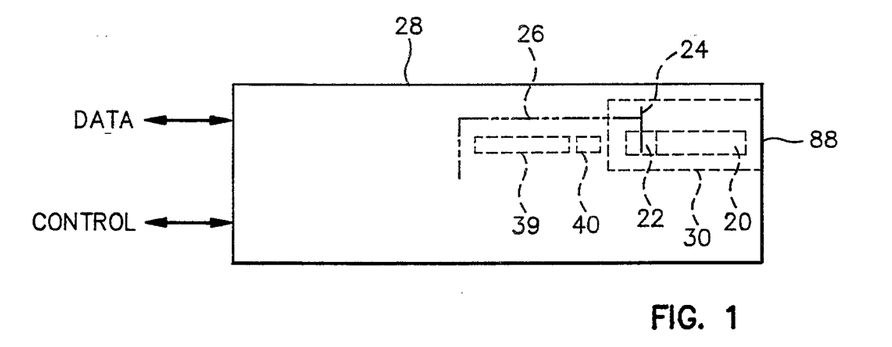
FIG. 1 is a schematic illustration of a leader block type magnetic tape cartridge inserted in a receptacle of a cartridge drive.

Referring now to the drawings wherein like referenced numerals designate like or similar parts throughout the several view, there is illustrated in FIG. 1 a magnetic tape cartridge 20 which has a new generation leader block 22, the new generation leader block 22 being interlocked with a new generation leader block pin 24. The leader block pin 24 is connected to an arm 26, the arm being conventionally operated by a cartridge drive 28. During an interlock phase, the cartridge 20 resides within a receptacle 30 which supports the cartridge and which is considered part of the cartridge drive 28. The invention preserves most of the existing components of currently available magnetic tape cartridges except for the new generation leader block 22 and a new generation magnetic tape 32 (see FIG. 3), the tape 32 being wound on a reel 34.

Figure 3:
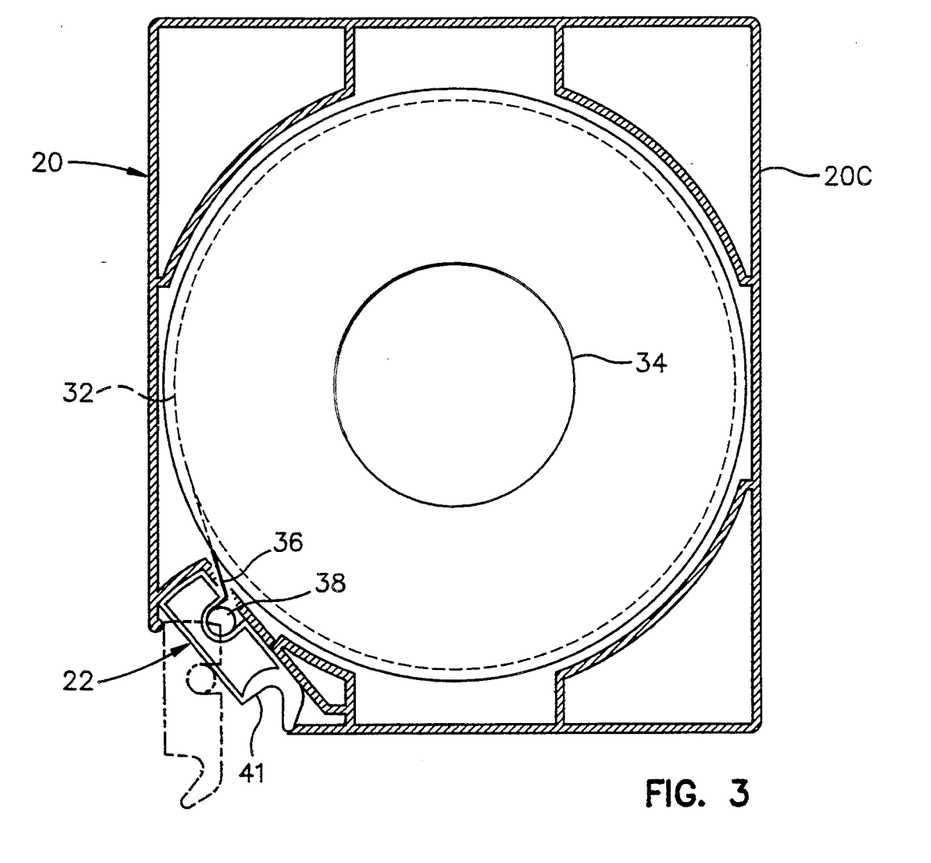
FIG. 3 is a top view of a prior art cartridge with new generation magnetic tape and a new generation leader block, the top of the cartridge being removed to show various details thereof.

The new generation magnetic tape 32 is different in formulation and thickness from the present generation magnetic tape. Accordingly, the new tape requires a cartridge drive 28 which is adapted to handle these new characteristics. It is important that the cartridge 20 with the new generation magnetic tape not be loaded into a present generation cartridge drive. If this occurred there is a high probability that the tape would be destroyed and that valuable data would be lost. This loading is accomplished by the arm 26 which is actuated by the cartridge drive 28. As illustrated in FIG. 3, a leader portion 36 of the tape 34 is connected to the leader block 22 by a pin 38. The arm 26 and the leader block pin 24 withdraw the leader block 22 from the cartridge 20 and transport the leader block and attached magnetic tape to a drive reel 39 within the drive 28. After this is accomplished the magnetic tape can be processed by read and write devices 40 which are also in the cartridge drive 28. Except as described herein, the cartridge drive 28, arm 26 and the magnetic tape cartridge 20 all correspond to similar components which are well known within the art and will not be further described herein.

Figure 2:
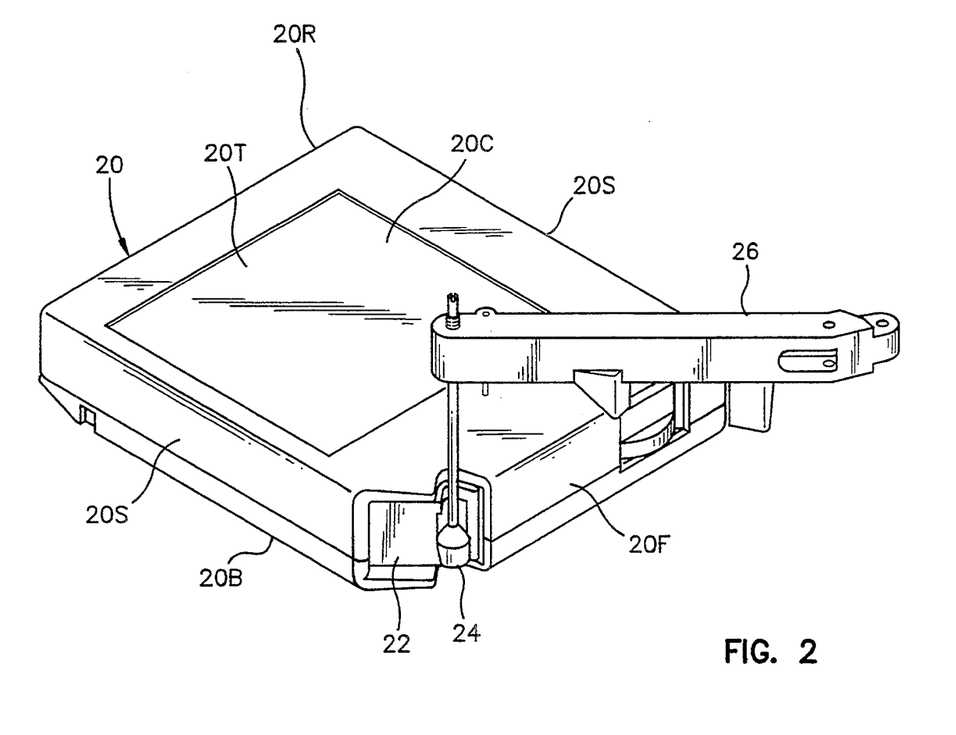
FIG. 2 is an isometric view of the new generation leader block of a magnetic tape cartridge interlocked with a new generation leader block pin.

In FIG. 2, the magnetic tape cartridge 20, the leader block 22, the leader block pin 24 and the arm 26 are shown in more detail. The arm 26 is known in the art as the "Pantocam" arm. As shown in FIG. 2, the magnetic tape cartridge 20 includes a generally rectangular container 20C which has top and bottom plates 20T and 20B, front and rear plates 20F and 20R and a pair of side plates 20S, the plates collectively providing the container with a pair of front corners and a pair of rear corners. As shown in FIG. 3, the leader block 22 is generally rectangular and has an elongated notch 41 through which the pin 24 is inserted to capture the leader portion 36 of the magnetic tape 34. After the arm 26 fully extends, as shown in FIG. 1, the cartridge 20 is inserted in the drive 28. The pin 24 enters the notch 41 and the cartridge drops down to implement the interlock. It is important that the cartridge register in its full down position to implement the interlock and enable the process to continue.

Figure 4:
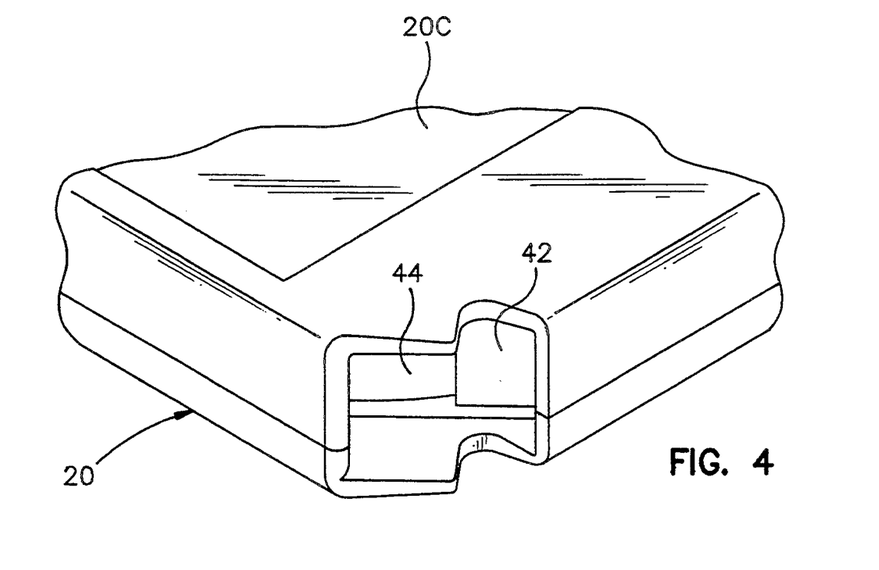
FIG. 4 is an isometric illustration of a well in one corner of the cartridge with the leader block removed.
Figure 5:
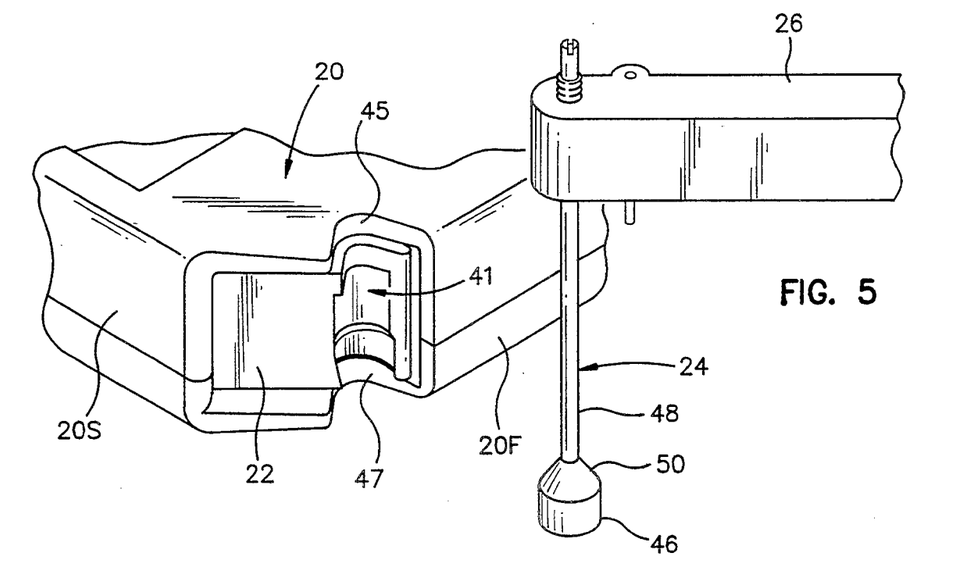
FIG. 5 is an isometric illustration of the new generation leader block nested in the cartridge and a new generation leader block pin disengaged therefrom.

As can be seen from FIGS. 2, 3 and 4, one of the front corners of the container 20C is beveled and is provided with a well 42 for receiving the leader block 22 in its nested position, as illustrated in FIG. 3. As illustrated in FIG. 4, the well 42 has an opening 44 for passage of the magnetic tape therethrough. As shown in FIG. 5, the top and bottom plates of the cartridge are provided with notches 45 and 47. The cartridge plate notches 45 and 47 and the leader block notch 41 are substantially axially aligned with respect to one another when the leader block 22 is nested within the well 42 of the cartridge 20.

Figure 6:
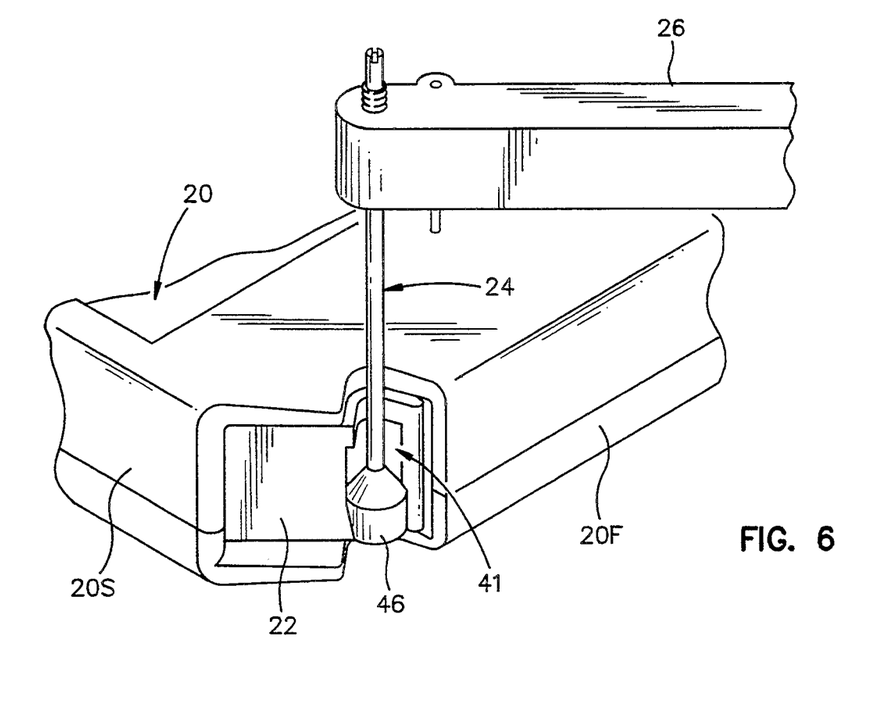
FIG. 6 is similar to FIG. 5 except the new generation leader block pin is interlocked with the new generation leader block.
Figure 7:
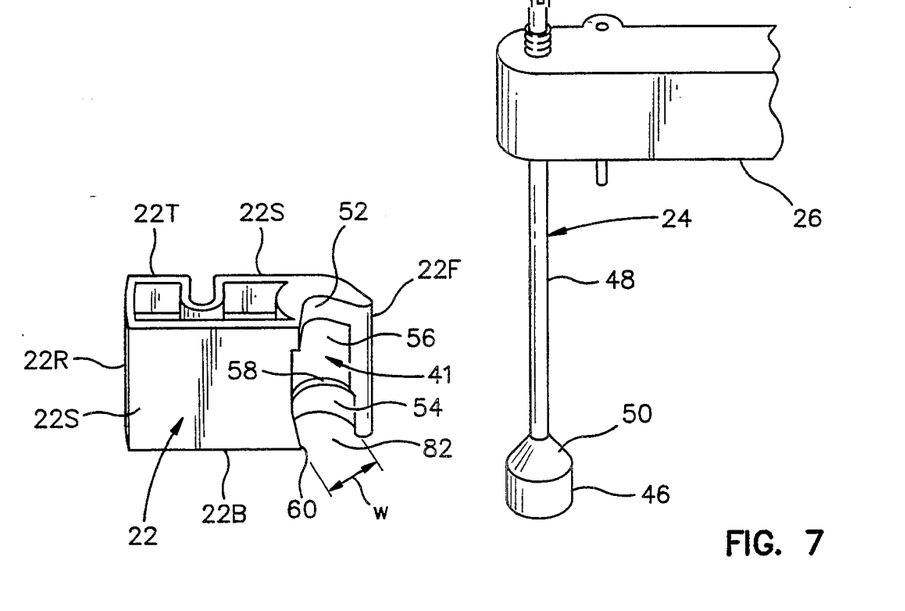
FIG. 7 is an isometric illustration of just the new generation leader block and the new generation leader block pin.
Figure 8:
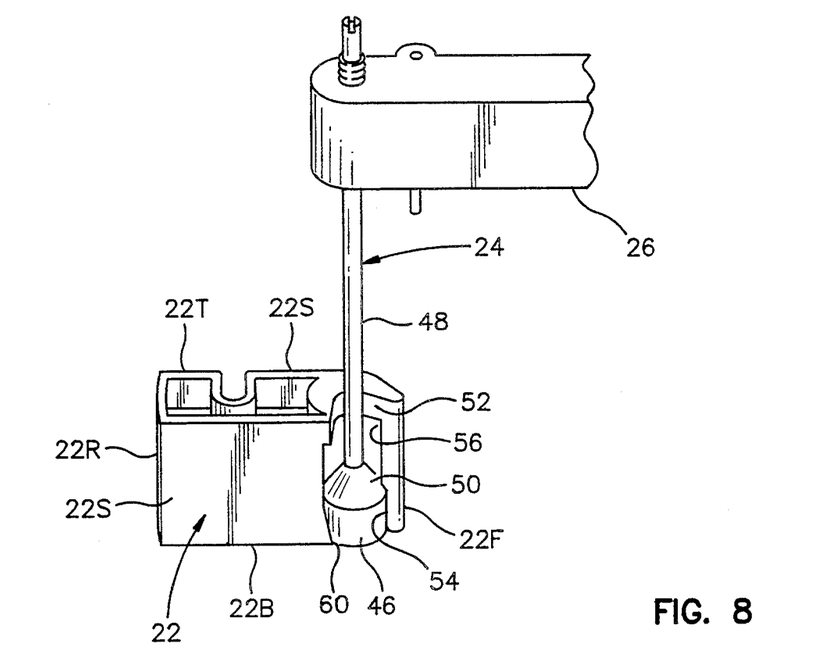
FIG. 8 is an isometric illustration of the new generation leader block pin interlocked with the new generation leader block.
Figure 9:
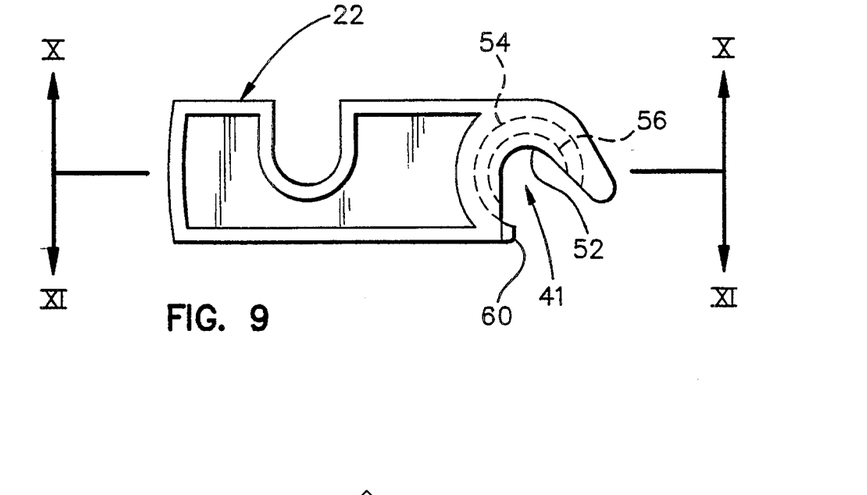
FIG. 9 is a top view of the new generation block.
Figure 10:
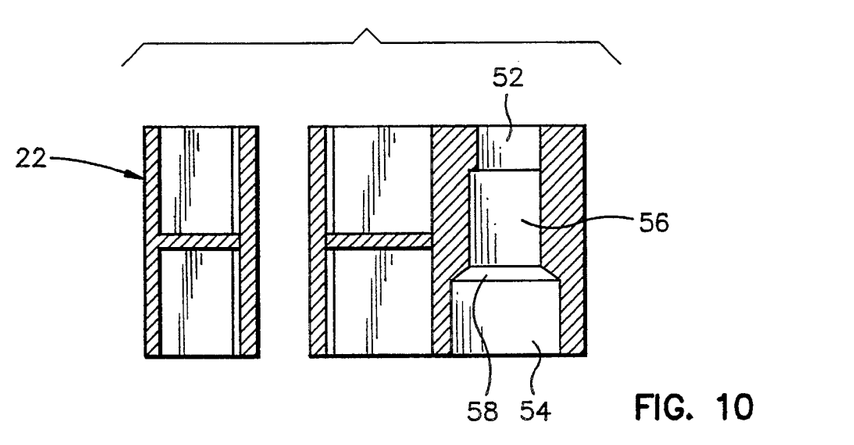
FIG. 10 is a cross-sectional view taken along plane X—X of FIG. 9.
Figure 11:
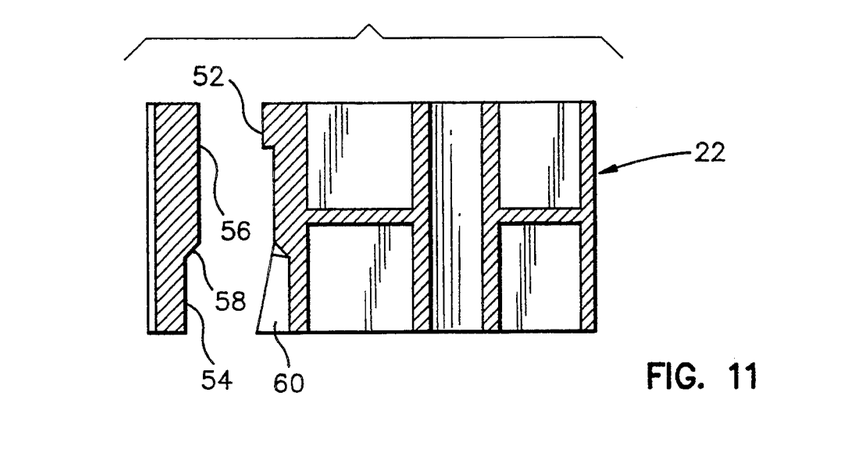
FIG. 11 is a cross-section view taken along plane XI—XI of FIG. 10.

As shown in FIGS. 5 and 7, the leader block pin 24 has a bottom enlarged cylindrical portion 46 which is axially connected to a cylindrical stem 48, the stem 48 in turn being connected to the arm 26. Interconnecting the cylindrical portion 46 to the stem portion 48 is a frusto-conical or chamfered portion 50. The pin 24 is shown in a disengaged position with respect to the block 22 in FIG. 5, and in FIGS. 6 and 8, the pin is shown interlocked with the block 22. When the pin 24 is interlocked with the leader block 22 the magnetic tape can be withdrawn from the tape cartridge 20 by the arm 26 for transport to read and write devices 40 within the drive 28. What is shown in FIGS. 6 and 8 is an interlocking which should only take place between new generation components. Otherwise, a prior art leader block pin should be prevented from interlocking with a new generation leader block and a new generation leader block pin should be prevented from interlocking with a prior art leader block. In any instance, however, the corresponding cartridge should fully register in either drive before preventative measures are undertaken. This will prevent confusion on the part of the operator. The arrangement for accomplishing these purposes is described in detail hereinbelow.

The notch 41 in the new generation leader block 22 has three portions, as illustrated in FIGS. 7, 9, 10 and 11. The notch in the new generation block 22 has top, bottom and middle portions 52, 54 and 56 respectively. As can be seen from the figures, the cross section of the middle portion of the notch is smaller than the cross section of the bottom portion of the notch and the cross section of the top portion of the notch is smaller than the cross section of the middle portion of the notch. The bottom notch portion 54 is defined by a circular arc of more than 180° for receiving and capturing the enlarged cylindrical portion 46 of the leader block pin 24. As can be seen from FIG. 8, the cylindrical portion 46 interlocks within the bottom cylindrical portion 54 of the notch within the block 22.

Because of erratic movements in the arm 26 caused by unwanted perturbations of the drive 28, the notch 40 is specially configured to prevent an accidental unlocking of the interlock shown in FIG. 8. The invention provides the top portion 52 of the notch with a smaller dimension than the notch portions 54 and 56 so as to confine the lateral movement of the stem 48 of the leader block pin 24. This shape, which is preferably parabolic, is illustrated in FIG. 7 where the parabolic shape allows entrance of the cylindrical stem portion 48 but confines lateral movement of the stem as it nests in the bottom of the parabolic shape. It is important that the new leader block pin 24 interlock with the new block 22 when the cartridge 20 is fully registered in its down position within the drive 28. This is accomplished by implementing the interlock within the bottom notch portion 54.

As shown in FIG. 7, the new generation leader block 22 has front and rear ends 22F and 22R which define a length, sides 22S, which define a width, and top and bottoms 22T and 22B, which define a depth. As shown in FIG. 7, it is preferable that the notch 41 extend completely through the depth of the leader block 22 from the top 22T to the bottom 22B. It is also desirable that the bottom portion 54 of the notch be joined to the middle portion 56 of the notch by a frusto-conical or chamfer portion 58. The bottom notch portion 54 and frusto-conical portion 58 snugly receive the bottom cylindrical portion 46 and frusto-conical portion 50 of the leader block pin 24.

The aforementioned arc of the bottom notch portion 54 of the leader block 22 may increase in length from its top to its bottom. At its bottom the length of the arc is at a maximum so as to provide a tapered extension 60. The tapered extension 60 increases the engagement of the bottom notch portion 54 with the cylindrical portion 46 of the leader block pin 24. It is preferable that the arc at the bottom of the tapered extension 60 be at least 181°. The one degree over 180° is necessary to insure capture of the cylindrical portion 46 within the bottom portion 54. However, a preferred arc at the bottom of the tapered extension 60 is in the range of 190° to 260°.

Figure 12:
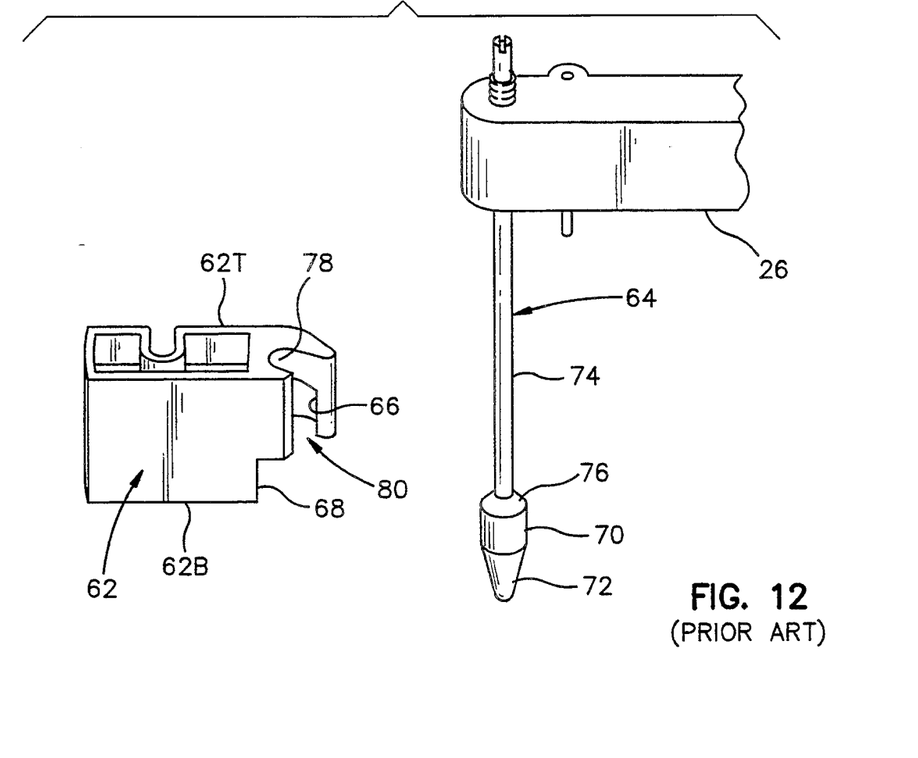
FIG. 12 is an isometric illustration of the prior art leader block and leader block pin.

In FIG. 12 there is shown a prior art leader block 62 and a prior art leader block pin 64. The leader block 62 has a top 62T and a bottom 62B which define a depth thereof. A notch 66 in this block extends only part way through the depth of the block. The remainder of the block is cut out at 68. Consequently, the leader block pin 64 interlocks with the leader block 62 in a position which is higher than the interlocking of the new generation pin with the new generation block as illustrated in FIG. 8. It is important to note, however, that in either instance the interlock takes place only after the cartridge 20 is fully registered in its down position within a cartridge drive.

Figure 13:
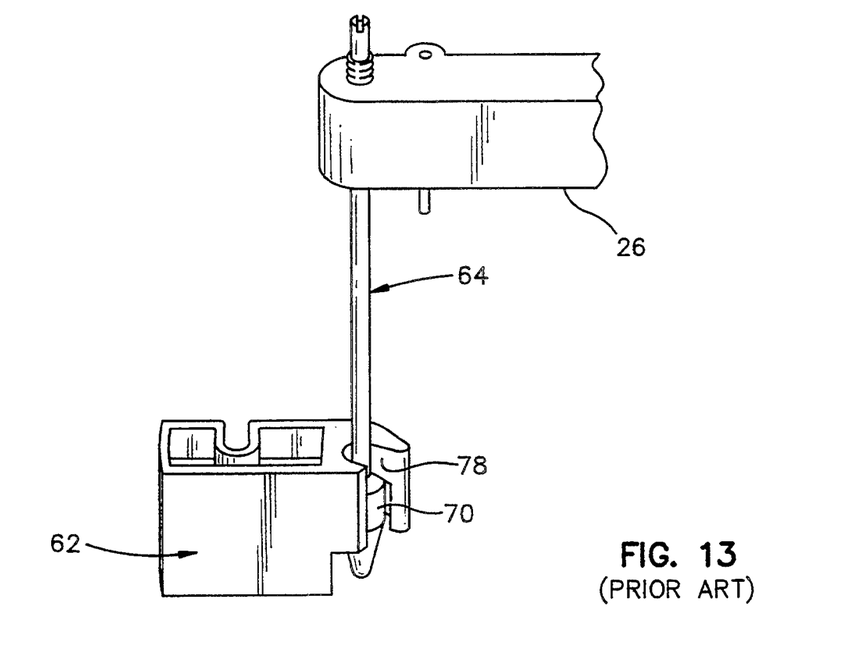
FIG. 13 is an isometric illustration of the prior art leader block interlocked with the prior art leader block pin.

As shown in FIG. 12, the leader block pin 64 has an enlarged cylindrical bottom portion 70 which terminates in a bottom frusto-conical tapered portion 72. The leader block pin 64 includes an elongated cylindrical stem 74 which is connected to the bottom cylindrical portion 70 by a frusto-conical transition portion 76. The operative part of the leader block pin 64 is the cylindrical portion 70 which has a diameter in the range of 5.95 to 6.05 millimeters. As shown in FIG. 12, the notch 66 in the prior art leader block 62 has a top portion 78 and a bottom portion 80. The bottom portion 80 is generally cylindrical shaped to receive the cylindrical portion 70 of the leader block pin 64. The diameter of the cylindrical cavity within the bottom portion 80 is approximately 7 millimeters and the opening to this notch portion is approximately 4 millimeters. The top portion 78 of the notch is generally U-shaped and has a uniform width at its lateral opening of approximately 4.0 millimeters. FIG. 13 illustrates the prior art leader block pin 64 interlocked with the prior art leader block 62. Since the width of the lateral opening of top notch portion 78 and the width of the lateral opening of the bottom notch portion 80 are both less than the diameter of the cylindrical portion 70 of the leader block pin 64, the leader block pin is captured within the bottom notch portion of the block for transport purposes.

Figure 14:
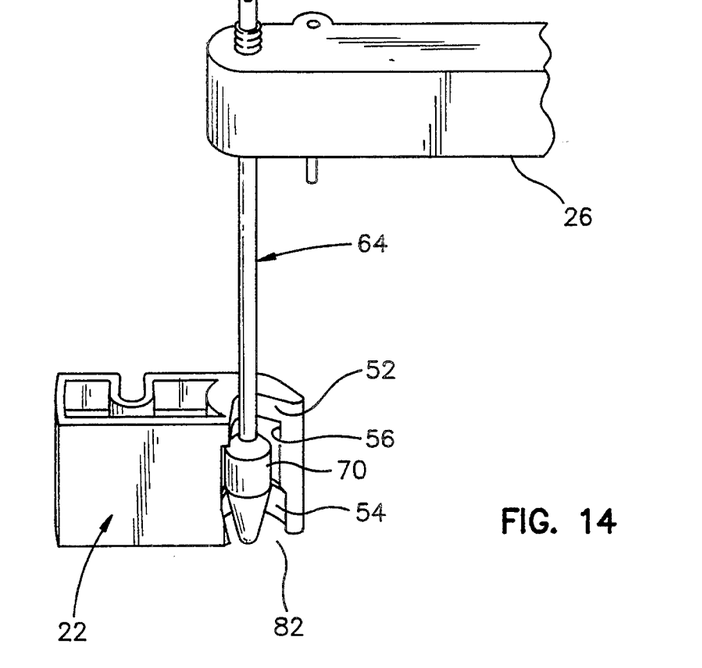
FIG. 14 is an isometric illustration of the prior art leader block pin failing to interlock with the new generation leader block.

FIG. 14 illustrates an attempt to interlock the prior art leader block pin 64 with the new generation leader block 22. Interlock is prevented by special dimensioning of the top, middle and lower notch portions of the new generation block 22. In the preferred embodiment, (see FIG. 7) the cylindrical diameter of the bottom notch portion 54 is 8 millimeters, the diameter of the cylindrical configuration of the middle notch portion 56 is 6.3 millimeters, and the lateral opening at 82 has a width of 7 millimeters. In order to prevent an interlock between the cylindrical portion 70 of the prior art leader block pin 64 and the notch within the new generation leader block 22, the width of the lateral opening into each of the top notch portion 52, the bottom notch portion 54 and the middle notch portion 56 are greater than the diameter of the cylindrical portion 70 of the prior art leader block pin 64, which diameter is 6.05 mm. With this arrangement the prior art leader block pin 64 will be released from the notch in the new generation block because there is insufficient structure to grab its cylindrical portion 70. An important feature of the invention is that the cylindrical portion 70 of the prior art leader block pin 64 has recessed into the middle notch portion 56 of the new generation leader block 22. This allows the cartridge 20 to fully register in its down position within a cartridge drive so that an operator does not think that there is something wrong with the drive. After full registration of the cartridge the arm 26 pulls the prior art block pin 64 out of the notch in the new generation block 22, thus indicating to the operator that he needs to use a prior art tape drive instead of the new generation tape drive.

Figure 15:
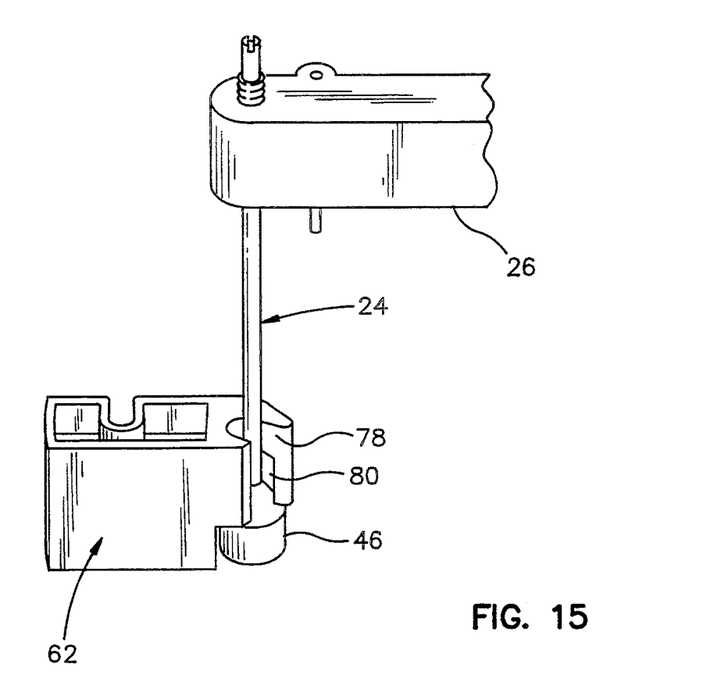
FIG. 15 is an isometric illustration of the new generation leader block pin failing to interlock with the prior art leader block.

In FIG. 15, there is illustrated an attempt to interlock the new generation leader block pin 24 with the prior art leader block 62. As stated hereinabove, the diameter of the bottom notch portion 80 is 7 millimeters. In contrast, the diameter of the bottom cylindrical portion 54 of the new generator leader block pin 24 is 7.6 to 7.8 millimeters. This diameter is too large to register within the cavity of the prior art bottom notch portion 80. Consequently, the new generation leader block pin 24 will not interlock with the prior art leader block 62 and will slide out of the leader block 62. It should be noted that the stated diameter for the cylindrical portion 46 of the new generation leader block pin 24 is fashioned for snug engagement within the bottom notch portion 54 of the new generation block 22, as shown in FIG. 8. For comparison purposes the dimensions of the notch portions of the prior art block and the new generation block are set forth in Table I and the dimensions of the prior art block pin and the new generation leader block pin are set forth in Table II hereinbelow.

TABLE I

| Dimension of Leader Block Notch Portions | | |
|---|---|---|
| | Prior Art | New Generation |
| Top (Shape) | U-shaped | Parabolic |
| Top (Width of Lateral Opening) | 4.5 mm | 6 mm |
| Middle (Shape) | None | Cylindrical (D = 6.3 mm) |
| Middle (Width of Latreal Opening) | None | 7 mm |
| Bottom (Shape) | Cylindrical (D = 6.5 mm) | Cylindrical (D = 8 mm) |
| Bottom (Width of Lateral Opening) | 4.5 mm | 6.5 mm |

TABLE II

| Dimensions of Leader Block Pin Portions | | |
|---|---|---|
| | Prior Art | New Generation |
| Stem (Shape) | Cylindrical (D = 3 mm) | Cylindrical (D = 3 mm) |
| Enlarged Cylinder (Shape) | Cylindrical (D = 6 mm) | Cylindrical (D = 7.7 mm) |

Figure 16:
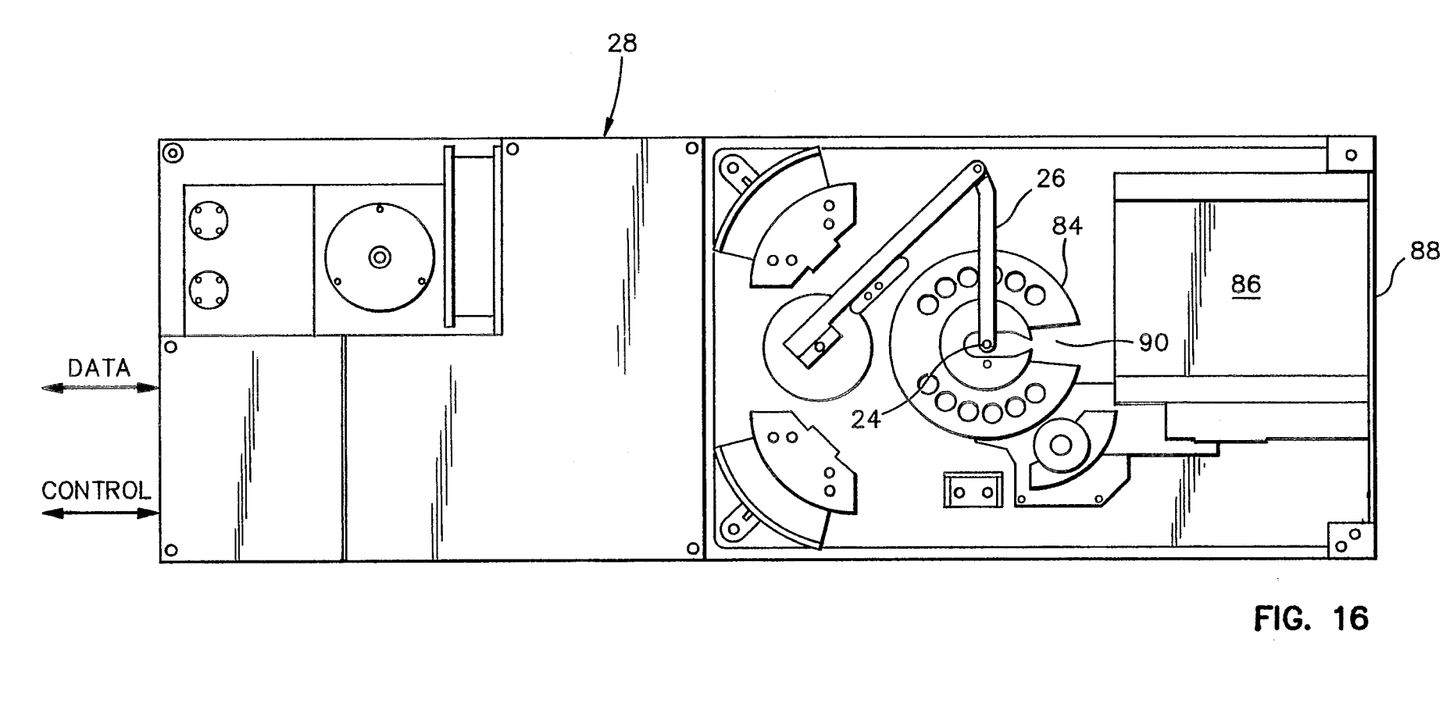
FIG. 16 is an isometric view of a cartridge drive employing a particular type of arm and leader block pin for processing magnetic tape cartridges inserted in the drive receptacle.

FIG. 16 shows a drive 28 which can be used for processing the cartridge 20. The leader block pin 24 is moved by the arm 26 between a position at the center of a reel 84 and a position adjacent a cartridge receptacle 86. The first position is shown in FIG. 16. When the pin 24 is adjacent the receptacle 86 a cartridge is inserted through a slot 88 into the receptacle 86, after which the cartridge drops down to interlock its leader block (not shown) with the pin 24. The arm 24 then transports the block with the magnetic tape leader from the receptacle 86 through a radial slot 90 in the reel 84 to the central reel location. The reel 84 then turns to wind the tape, and a read/write head (not shown) adjacent the receptacle 86 processes the tape. After processing the tape a reel (not shown) in the cartridge is driven within the receptacle 86 to return the tape and block to the cartridge.

It is now readily apparent that the present invention provides a new generation leader block and leader block pin which will prevent interlock between a new generation block and a prior art leader block pin or the interlock of a prior art leader block with a new generation leader block pin. This will prevent transport of a new generation tape to a prior art cartridge drive, and will prevent transport of a prior art tape to a new generation tape drive. Without these preventative measures, the respective tapes would most likely be destroyed and valuable data would be lost. One of the main features of the present invention is that the desired results have been obtained without major alterations of existing magnetic tape cartridges and existing cartridge drives. Further, the results have been obtained before any transport of the cartridge block and attached tape. The new generation leader block and leader block pin are specially configured to interlock and maintain stability even though there are radical movements caused by the transport assembly of the cartridge drive.

Although the invention has been described in terms of a specific embodiment, the inventors contemplate that modifications and substitutions to various components of the inventions would occur to persons of ordinary skill in the art and, therefore, would be within the scope of the invention, which is to be limited only by the claims which follow.

We claim:

1. A magnetic tape cartridge of the type having a leader block for receiving and capturing a leader block pin which has an enlarged cylindrical portion connected to a stem, the cartridge comprising:

a generally rectangular container having top and bottom plates, front and rear plates, and a pair of side plates, the plates providing the container with a pair of front corners and a pair of rear corners;

a generally rectangular leader block which is adapted to be connected to a leader end of a magnetic tape within the container, the magnetic tape having a thickness less than 72 gauge;

one of the front corners of the container being bevelled and provided with a well to receive the leader block in a nested position;

the leader block having an elongated notch which has top, bottom and middle portions which extend completely through a depth of the leader block, the longitudinal axis of the notch extending substantially perpendicularly to the top and bottom plates of the container when the block is nested in the container well:

the cross section of the middle portion of the notch being smaller than the cross section of the bottom portion of the notch and the cross section of the top portion of the notch being smaller than the cross section of the middle portion of the notch;

each of the top, middle and bottom portions of the notch having a lateral opening with a width greater than 6.05 mm; and the cross section of the bottom portion of the notch being defined by a circular arc of more than 180 degrees for receiving anal capturing the enlarged cylindrical portion of the leader block pin.

2. A magnetic tape cartridge as claimed in claim 1 including:

the top portion of the notch in the block being fashioned to confine the stem to a predetermined amount of lateral movement.

3. A magnetic tape cartridge as claimed in claim 1 including:

the cross section of the middle portion of the notch being defined by a circular arc which has a diameter greater than 6.05 min.

4. A magnetic tape cartridge as claimed in claim 1 including:

the magnetic tape being of the metal particle type.

5. A magnetic tape cartridge as claimed in claim 2 including:

the cross section of the top portion of the notch in the leader block being substantially parabolic.

6. A magnetic tape cartridge as claimed in claim 1 including:

the arc of the bottom portion of the notch in the leader block being in a range of 181 degrees to 250 degrees.

7. A magnetic tape cartridge as claimed in claim 1 including:

the arc of the bottom portion of the notch in the leader block tapering on one side of the notch portion from a maximum at the bottom thereof to a minimum at the top thereof.

8. A magnetic tape cartridge as claimed in claim 7 including:

the minimum arc being greater than 180 degrees and less than 190 degrees and the maximum arc being in the range of 190 degrees to 260 degrees.

9. A combination including the magnetic tape cartridge of claim 1, the combination comprising:

a solid leader block pin;

the leader block pin having an enlarged cylindrical bottom portion which is connected to a cylindrical stem portion, the bottom cylindrical portion having a diameter greater than 6.05 mm;

the cylindrical bottom portion being adapted to be captured in the bottom portion of the notch of the leader block and the stem portion being adapted to be confined by the top notch portion of the leader block.

10. A combination as claimed in claim 9 including:

the arc of the bottom notch portion in the leader block tapering on one side of the notch portion from a maximum at the bottom thereof to a minimum at the top thereof.

the minimum arc being greater than 180 degrees and less than 190 degrees and the maximum arc being in the range of 190 degrees to 260 degrees.

11. A combination as claimed in claim 10 including: the diameter of the circular arc of the bottom notch portion being greater than 6.05 mm.

12. A combination as claimed in claim 11 including:

the cross section of the middle portion of the notch being defined by a circular are which has a diameter greater than 6.05 mm but less than the diameter of the enlarged cylindrical bottom portion of the leader block pin.

13. A combination comprising:

a magnetic tape cartridge of the type which has an elongated leader block;

a magnetic tape mounted in the cartridge and having a leader connected to the leader block;

the magnetic tape having a thickness less than 72 gauge;

the leader block having a notch which has top, bottom and middle portions which extend completely through a depth of the leader block, the cross-section of the middle portion being smaller than the cross-section of the bottom portion and the cross section of the top portion being smaller than the cross section of the middle portion;

the cross section of the bottom portion of the notch being defined by a circular arc of more than 180 degrees;

the top, bottom and middle notch portions of the leader block each having an outer lateral opening, each outer lateral opening having a width which extends laterally to the longitudinal axis of the notch and which is greater than 6.05 mm;

the width of each outer lateral opening being greater than 6.05 mm;

a cartridge drive;

the cartridge drive having an arm actuated leader block pin for interlocking with the leader block;

the leader block pin having an enlarged cylindrical bottom portion which is connected to a cylindrical stem portion, the bottom cylindrical portion having a diameter greater than 6.05 mm;

the diameter of the enlarged cylindrical bottom portion being smaller than a diameter of the bottom notch portion but larger than a diameter of the middle notch portion so that the enlarged cylindrical bottom portion can be captured in the bottom notch portion of the leader block while the stem portion is confined by the top notch of the leader block;

whereby the arm and leader block pin are capable of transporting the leader block and magnetic tape from the cartridge to a remote location for processing.

14. A combination as claimed in claim 13 including:

the cross section of the top notch portion being parabolic and fashioned to confine the stem to a predetermined amount of lateral movement.

15. A combination as claimed in claim 13 including:

the cross section of the middle portion of the notch being defined by a circular arc which is greater than 6.05 mm but less than the diameter of the enlarged cylindrical bottom portion of the leader block pin.

16. A combination as claimed in claim 15 including:

the arc of the bottom notch portion in the leader block tapering on one side of the notch portion from a maximum at the bottom thereof to a minimum at the top thereof.

17. A magnetic tape cartridge as claimed in claim 16 including:

the minimum arc being greater than 180 degrees and less than 190 degrees and the maximum arc being in the range of 190 degrees to 260 degrees.

18. A combination of first and second magnetic tape transport assemblies which are not compatible with respect to one another comprising:

each of the first and second magnetic tape assemblies including:

a magnetic tape cartridge, a reel rotatably mounted in the cartridge, magnetic tape wound on the reel, a leader block releasably mounted to the cartridge and the magnetic tape being connected to the leader block so that the magnetic tape can be selectively withdrawn from and returned to the cartridge; and a magnetic tape drive, a leader block pin which is capable of interlocking with the leader block when the cartridge is loaded in the drive, the leader block pin being movably mounted in the drive so that upon interlock the leader block with the magnetic tape can be transported by the leader block pin for processing of the magnetic tape within the drive:

the magnetic tape cartridge and the magnetic tape drive of the first assembly being substantially the same as the magnetic tape cartridge and the magnetic tape drive respectively of the second assembly;

the pin of the first assembly having an enlarged cylindrical portion connected to a stem, the cylindrical portion having a diameter $d_1$;

the block of the first assembly having top and bottom notch portions, the bottom notch portion having a diameter $d_2$ equal to or greater than $d_1$ and having a lateral opening with a width which is less than $d_1$ so that the pin of the first assembly can extend into the bottom notch of the block of the first assembly and will interlock therein:

the pin of the second assembly having an enlarged cylindrical portion connected to a stem, the cylindrical portion having a diameter $d_3$ which is greater than $d_2$ so that the pin of the second assembly cannot extend into the bottom notch of the block of the first assembly and will not interlock therein; and the block of the second assembly having top and bottom notch portions, the bottom notch portion having a diameter $d_4$ which is equal to or greater than $d_3$ and a lateral opening with a width which is less than $d_3$ but greater than $d_1$ so that the pin of the second assembly can extend into the bottom notch of the block of the second assembly and interlock therein while the pin of the first assembly can extend into the bottom notch of the block of the second assembly but will not interlock therein.

19. A combination as claimed in 18 including:
each of the bottom notch portions of the first and second assemblies having an arc of more than 180 degrees which defines the width of the respective lateral opening.

20. A combination as claimed in 18 including:
the diameter $d_1$ of the cylindrical portion of the pin of the first assembly being substantially 6.05 mm.

21. A combination as claimed in claim 18 including:
the top notch of each of the blocks of the first and second assemblies having a lateral opening to receive the stem of each of the pins of the first and second assemblies.

22. A combination as claimed in 21 including:
the cross section of the top notch portion of each of the blocks of the first and second assemblies being substantially parabolic.

23. A combination as claimed in 18 including:
the tape of the second assembly having a gauge less than 72.

24. A combination as claimed in 18 including:
the tape of the first assembly having a gauge of substantially 72 and the tape of the second assembly having a gauge less than 72.

25. A combination as claimed in 24 including:
the tape of the second assembly having a gauge of substantially 57.

26. A combination as claimed in 18 including:
the block of the second assembly having a middle notch portion, the middle notch portion having a diameter $d_5$ which is less than $d_3$ so that the pin of the second assembly cannot extend into the middle notch of the block of the second assembly and will not interlock therein, and the middle notch portion having its diameter $d_5$ greater than $d_1$ and having a lateral opening with a width which is greater than $d_1$ so that the pin of the first assembly can extend into the middle notch portion of the second assembly but will not interlock therein; and the top, middle and bottom notch portions of the block of the second assembly extending completely through a depth of the block of the second assembly.

27. A combination as claimed in 26 including:
each of the bottom notch portions of blocks of the first and second assemblies having an arc of more than 180 degrees which defines the width of the respective lateral opening.

28. A combination as claimed in 27 including:
the tape of the second assembly having a gauge less than 72.

29. A combination as claimed in 28 including:
the diameter $d_1$ of the cylindrical portion of the pin of the first assembly being substantially 6.05 mm.

30. A combination as claimed in 29 including:
the top notch of each of the blocks of the first and second assemblies having a lateral opening to receive the stem of each of the pins of the first and second assemblies.

31. A combination as claimed in 30 including:
the cross section of the top notch portion of each of the blocks of the first and second assemblies being substantially parabolic.

32. A combination as claimed in claim 31 including:
the tape of the first assembly having a gauge of substantially 72 and the tape of the second assembly having a gauge of substantially 57.

* * * * *

UNITED STATES PATENT AND TRADEMARK OFFICE
CERTIFICATE OF CORRECTION

PATENT NO. : 5,379,167
DATED : January 3, 1995
INVENTOR(S) : Robles et al

It is certified that error appears in the above-indentified patent and that said Letters Patent is hereby corrected as shown below:

Column 2, line 62, please change "Din" to --pin--.

Column 8, line 68, please change "anal" to --and--.

Signed and Sealed this

Eighteenth Day of April, 1995

*Attest:*

BRUCE LEHMAN

*Attesting Officer*  *Commissioner of Patents and Trademarks*